United States Patent Office 3,058,946
Patented Oct. 16, 1962

3,058,946
PLASTIC PRODUCT COMPRISING CURED MIXTURE OF A BROMINATED POLYEPOXIDE AND A NON-HALOGENATED POLYEPOXIDE
Richard C. Nametz, St. Louis, Mich., assignor to Michigan Chemical Corporation, St. Louis, Mich., a corporation of Michigan
No Drawing. Filed Aug. 5, 1958, Ser. No. 753,193
4 Claims. (Cl. 260—42)

This invention relates to a flame retardant epoxy resin which is suitable for admixture with flammable epoxy resins to render them flame retardant and to such resin mixtures.

In the recent past, the epoxy resins have been produced in rapidly increasing volume. These resins have found wide-spread use in surface coatings, adhesives, laminates, castings, plastic tools and dies, foams, molding compounds and a number of miscellaneous uses. These resins have valuable properties which adapt them for these widely varied uses, although their flammability is an undesirable property in many of these uses.

It is an object of this invention to provide an epoxy type resin which is itself fire retardant and which renders other epoxy resins fire retardant when admixed therewith even in relatively minor proportions.

It is a further object to provide an epoxy resin mixture which can be cured and otherwise processed in the same manner as the epoxy resins heretofore produced and which retain the valuable properties of the epoxy resins, but which are of materially reduced flammability.

Other objects of this invention and its various advantageous features will become apparent as this description proceeds.

The product in accordance with this invention is a condensation product of a nuclear brominated bisphenol with a chlorohydrin and is, itself, a bromine-containing epoxy resin. This bromine-containing polyepoxide is generally compatible with polyepoxides which contain no bromine and like those resins can be cured. Admixtures of this bromine-containing polyepoxides with the ordinary, non-brominated polyepoxides can be cured and otherwise processed in the same manner as the ordinary, non-brominated polyepoxides.

The nuclear brominated bisphenol which forms one of the essential constituents of this copolymer is a bisphenol which carries a total of from one to four bromine atoms on its phenyl groups.

The brominated bisphenol which is used may be a alkylidene bisphenol, a sulfone bisphenol or a ketone bisphenol. The alkylidene bisphenol may be represented by the following structural formula:

FORMULA I

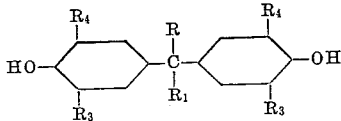

in which R and $R_1$ are the same or different and may be hydrogen or alkyl groups, aryl or substituted aryl groups, cyanoalkyl groups, carboxy alkyl groups, alkoxy alkyl groups or cycloalkyl groups, containing from one to seventeen carbon atoms, $R_3$ is bromine and $R_4$ is bromine or hydrogen. It may be, for example, Bis(3-bromo-4-hydroxyphenyl) methane.
2,2-bis(3-bromo-4-hydroxyphenyl) propane.
Bis(3-bromo-4-hydroxyphenyl) diphenyl methane.
1,1-bis(3-bromo-4-hydroxyphenyl)-1(2,5-dibromophenyl) ethane.
2,2-bis(3-bromo-4-hydroxyphenyl) propionitrile.
4,4-bis(3-bromo-4-hydroxyphenyl) pentanoic acid.
2,2-bis(3-bromo-4-hydroxyphenyl) 1-ethoxypropane.
Bis(3,5-dibromo-4-hydroxyphenyl) methane.
2,2-bis(3,5-dibromo-4-hydroxyphenyl) propane.
Bis(3,5-dibromo-4-hydroxyphenyl) diphenylmethane.
1,1-bis(3,5-dibromo - 4-hydroxyphenyl) - 1(2,5 - dibromophenyl) ethane.
2,2-bis(3,5-dibromo-4-hydroxyphenyl) propionitrile.
2,2-bis(3,5-dibromo-4-hydroxyphenyl) 1-ethoxypropane.
4,4-bis(3-bromo-4-hydroxyphenyl) pentanoic acid.

The brominated sulfone bisphenol which is used may be represented by the following structural formula:

FORMULA II

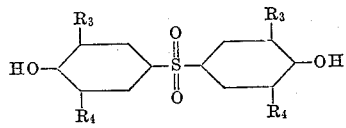

in which $R_3$ and $R_4$ have the same meaning as in Formula I. It may be, for example, Bis(3-bromo-4-hydroxyphenyl) sulfone.
Bis(3,5-dibromo-hydroxyphenyl) sulfone.

The brominated ketone bisphenyl which is used may be represented by the following structural formula:

FORMULA III

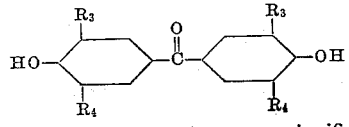

in which $R_3$ and $R_4$ have the same significance as in Formulas I and II. Of these various nuclear brominated bisphenols, I prefer to use 2,2-bis(3,5-dibromo-4-hydroxyphenyl) propane which, for the sake of brevity will hereinafter be referred to as "tetrabromobisphenol-A," since it may be prepared by the bromination of p,p-isopropylidene-bisphenol which is commonly known as "bisphenol A."

The chlorohydrin which is the other ingredient of the condensation product in accordance with this invention may be, for example, epichlorohydrin or glycerolchlorohydrin. I have found that epichlorohydrin is entirely satisfactory for this purpose and, in general, I prefer to use it in the production of my condensation product.

By the method in accordance with this invention, I react a stoichiometric excess of an epichlorohydrin with a nuclear brominated bisphenol in the presence of an alkaline material. I may, for example, react about 2 moles to about 20 moles of the epichlorohydrin with each mole of the brominated bisphenol, and prefer to react about 6 moles to about 12 moles of the epichlorohydrin with each mole of the brominated bisphenol. The considerable excess of the epichlorohydrin in this reaction, as in the reaction of the non-brominated bisphenol, is desirable to avoid undesirable side reactions. Suitable alkaline materials for use as a catalyst for this reaction are sodium hydroxide, potassium hydroxide, sodium carbonate, sodium bicarbonate, potassium carbonate and potassium bicarbonate. It is desirable to use an amount of the alkaline material slightly in excess of the two mole equivalents of the alkaline material for each mole of the epichlorohydrin present, which is required to carry the reaction to completion. An excessive quantity of the alkaline material tends to cause undesired side reactions. Thus, the amount of the alkaline material used for each mole of an epichlorohydrin present in the reaction mixture may be within the range of about 2 moles to about 2.5 moles.

As will be appreciated from the foregoing, a preferred polyepoxide in accordance with this invention is that formed by the reaction of tetrabromobisphenol-A with epichlorohydrin. It is believed that this condensation reaction proceeds, in the presence of an alkaline material, in accordance with the following equation:

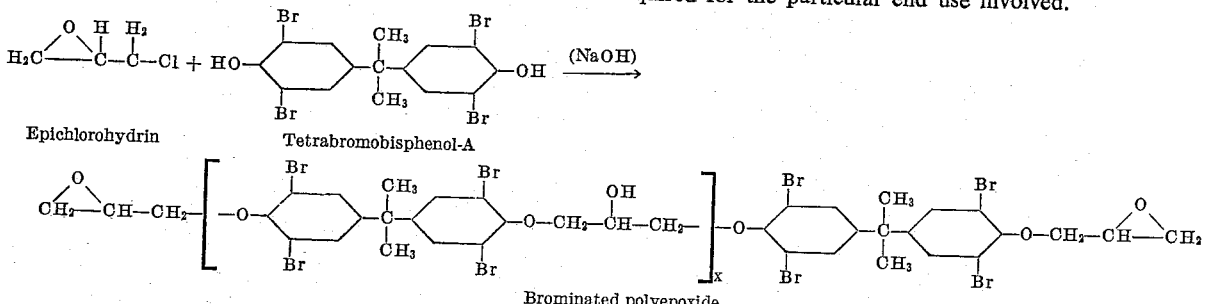

Epichlorohydrin   Tetrabromobisphenol-A

Brominated polyepoxide

In the foregoing formula for the brominated polyepoxide formed by this reaction, $x$ may be an integer from one to twelve depending upon the exact manner in which the reaction is carried out. A product in which the $x$ is zero may be produced by this reaction, which is believed to have the following structural formula:

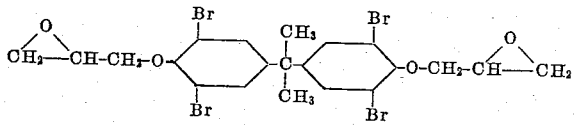

These bromine-containing polyepoxides are ordinarily tan in color and usually of higher viscosity than the corresponding non-brominated polyepoxides. They can be cured by essentially the same procedure and by the use of the same catalysts that are used for the curing of the non-brominated polyepoxides. The curing reaction of these bromine-containing polyepoxides has been observed to be less exothermic than that of the curing of the non-brominated polyepoxides. They harden somewhat more slowly than the non-brominated polyepoxides and therefore, require a somewhat longer curing time.

Upon curing these bromine-containing polyepoxides produce plastics which have satisfactory hardness and strength as compared with the plastics produced from the non-brominated polyepoxides. The plastics produced by the curing of the bromine-containing polyepoxides remain hard, strong and tough after immersion in boiling water for 10 minutes.

The bromine-containing polyepoxides are generally compatible in all proportions with the non-brominated polyepoxides. Mixtures of the bromine-containing polyepoxides with non-brominated polyepoxides, in accordance with this invention, can be cured in the same manner as the non-brominated polyepoxides alone. The admixture of the bromine-containing polyepoxides, even in relatively minor proportions, with the non-brominated polyepoxides followed by the curing of the mixture, results in a plastic which does not support combustion or has a materially shorter burning time than the corresponding plastic produced solely from the non-brominated polyepoxides. The plastics produced by the curing of the mixture of the bromine-containing polyepoxides with a non-brominated polyepoxide has, in addition to the materially reduced flammability, substantially the same desirable physical and chemical properties exhibited by the plastics produced by the curing of the non-brominated polyepoxides.

In the production of epoxy plastics which are of reduced flammability or which are non-inflammable, the brominated polyepoxide may be admixed with the non-brominated polyepoxide in a wide range of proportions. It has been found that the effectiveness of any particular polyepoxide in reducing the flammability of such a mixture is approximately proportional to the percentage by weight of bromine which it carries. The brominated polyepoxides are more expensive to produce than the non-brominated polyepoxides. For this reason it is desirable to utilize the smallest proportion of the brominated polyepoxide in such a mixture which will give the reduction in flammability or of non-flammability which may be required for the particular end use involved.

The effectiveness of the bromine-containing polyepoxide in reducing the flammability of its mixture with a non-brominated polyepoxide depends upon its exact chemical structure. However, the relative proportions required can be illustrated in the case of mixtures of the polyepoxide resulting from the condensation of tetrabromobisphenol-A with epichlorohydrin with, for example, the commercial polyepoxides known by the trade names Epon 828 and Epon 834, both marketed by the Shell Chemical Company and believed to be condensation products of bisphenol A and epichlorohydrin. Mixtures of 10%, by weight, of this bromine-containing polyepoxide, with 90%, by weight, of the Epon 828 or Epon 834, when in the form of a cured, solid plastic bar, will not support continued combustion and is self-extinguishing. A high proportion of the bromine-containing polyepoxide is, naturally, required to render the mixture self-extinguishing when in the form of a solid foam. However, as little as 20%, by weight, of the bromine-containing polyepoxide in admixture with 80%, by weight, of the non-brominated polyepoxide can be used to produce a solid foam which is self-extinguishing after it has been ignited by a flame.

The cured mixtures of bromine-containing polyepoxides and non-brominated polyepoxides in accordance with this invention may contain each of these types of polyepoxides in any desired relative proportions. Thus, they may contain from about 1%, by weight, to about 99% of the bromine-containing polyepoxide, with the remainder of the polyepoxide content of the composition being a polyepoxide containing no bromine. However, in general, an amount of the bromine-containing polyepoxide within the range of about 2%, by weight, to about 50%, by weight, of their mixture with polyepoxides is adequate to give the mixture the flame-retardancy required for the majority of end uses. I have found that it is usually preferable to include about 8%, by weight, to about 25%, by weight, of the bromine-containing polyepoxide in the composition, with the remainder being a polyepoxide containing no bromine. As brought out hereinafter, about 10%, by weight, of the bromine-containing epoxy resin in admixture with 90%, by weight, of a polyepoxide resin containing no bromine, produces a self-extinguishing composition which, in the form of a slender, solid strip, burned for only a very brief period after the removal of an igniting flame.

From the foregoing discussion, it will be understood that the maximum of 50%, by weight, of the bromine-containing polyepoxide is specified for economic reasons, since this percentage is usually adequate to secure adequate non-flammability and self-extinguishing properties.

The curing of the non-brominated polyepoxides is now a well developed art. An advantage offered by the bromine-containing polyepoxides and their mixtures with the non-bromine containing polyepoxides in accordance with this invention, arises from the fact that they may be cured by following, generally, the technology for the curing of non-bromine containing polyepoxides. As noted hereinbefore, the difference between the curing of the bromine-containing polyepoxides, and the prior art containing no bromine is, generally, a somewhat more sluggish reaction in the case of the bromine-containing polyepoxides. Also, the curing reaction of the bromine-containing polyepoxides is, generally, less exothermic than that of the curing of the non-bromine containing polyepoxides. Further, the bromine-containing polyepoxides harden somewhat more slowly than the non-brominated polyepoxides and, therefore, require a somewhat longer curing time.

The curing agents for the bromine-containing polyepoxides and the mixtures of these bromine-containing polyepoxides, in accordance with this invention, and the amount in which they are used are generally identical with those used in the curing of the non-brominated polyepoxides. Thus, suitable curing agents for the bromine-epoxides. Thus, suitable curing agents for the brominecontaining polyepoxides and their admixtures with noncontaining polyepoxides include primary, secondary, and brominated polyepoxides include primary, secondary, and tertiary amines, with the primary amines being generally more useful. Suitable amine curing agents are, for example, aliphatic amines, such as, diethylene triamine and diethylaminopropylamine, the monopropylene oxide adduct of ethylenediamine, aromatic amines, such as methylene dianiline, dimethylamino-methylphenol, tri-(dimethylaminomethyl) phenol, metaphenylenediamine, and the polyamide resins, sold under the trade names Versamid 100, Versamid 115 and Versamid 125 and many others.

Other curing agents which may be used for the curing of the bromine-containing polyepoxides and their admixtures with the non-brominated polyepoxides include boron trifluoride, and complexes of boron trifluoride, such as, for example, a boron trifluoride-triethanol amine complex. Suitable curing agents for this purpose also include dibasic acids and other polybasic acids and their anhydrides. Thus, for example, phthalic anhydride, maleic anhydride, and pyromellitic anhydride and their corresponding acids are suitable for this purpose.

The method for the preparation of the bromine-containing polyepoxide, in accordance with this invention, is illustrated by Example I.

EXAMPLE I

*Preparation of a Copolymer of Tetrabromobisphenol-A and Epichlorohydrin*

A solution of 1088 grams (2.0 moles) of tetrabromobisphenol-A in 1851 grams (20.0 moles) of epichlorohydrin was prepared and placed in a 5 liter, 3-necked flask provided with a mechanical stirrer, a reflux condenser and a thermometer. Thirty-two grams of sodium hydroxide pellets and 9.2 grams (0.51 moles) of water were then added to the mixture, which was then heated to 102° C. and the heating stopped. At this temperature there were only traces of reflux condensation on the sides of the flask. The exothermic heat of the reaction raised the temperature of the reaction mixture to 107° C. at which active reflux started. The reaction mixture had become black during the first ten minutes of heating and was this color when the active reflux began. After the reaction mixture had refluxed for about 4–5 minutes, all of the sodium hydroxide had dissolved, after another 3 minutes a precipitate of sodium chloride began to form and the reaction mixture became light tan. After another 11 minutes the temperature of the reaction mixture dropped to 102° C. and the reflux stopped. An additional 13 grams of sodium hydroxide pellets were added to the reaction mixture and when no exothermic heat was developed after 4 minutes, an additional 14 grams of sodium hydroxide pellets were added. The temperature of the reaction mixture continued to drop and after another 15 minutes was down to 96° C. External heat was again applied to the reaction mixture and an additional 27 grams of sodium hydroxide pellets were added. Thirty minutes later, when the temperature of the reaction mixture reached 98° C. the reflux again started. Two additional portions of sodium hydroxide pellets, of 27 grams each, were added to the reaction mixture at 15 minute intervals, to bring the total sodium hydroxide added to 163.2 grams or 4.08 moles. After the last portion of sodium hydroxide was added to the reaction mixture, it was refluxed for 40 minutes, then cooled and filtered with suction. The sodium chloride filtrate removed from the reaction mixture was dried and found to weight 344.6 grams. The filtrate was vacuum distilled to remove water and the excess chlorohydrin, taking the still temperature up to 141° C. at 3 mm. absolute mercury pressure, with a distillation temperature of 58° C., 8 ml. of water and 1211 grams of epichlorohydrin (82% of the theoretical excess) were collected. The resin remaining in the still pot was cooled, diluted with 700 ml. of benzene and filtered using Dicalite L filter aid. The filtrate was washed with one-half of its own volume of a 5%, by weight, sodium hydroxide solution and then with one-half of its volume of a 2%, by weight, sodium hydroxide solution. The filtrate was then tested for bisphenol-A and found to be free of it. It was then washed three times with successive portions of one-half of its own volume of water and its residual alkalinity neutralized by washing it with a very dilute aqueous solution of hydrochloric acid which contained only enough hydrogen chloride to render it acidic. The filtrate was then washed to free it of residual acid, refluxed utilizing a water-trap to dry it and again filtered using Dicalite L as a filter aid. The filtered solution of the polyepoxide was then freed of benzene by distillation under vacuum (17 mm. of mercury, absolute) while taking the still temperature to 156° C. with a distillation temperature of 156° C. The desired bromine-containing polyepoxide resin remained as a residue in the still pot, and was found to weigh 1237 grams, representing a theoretical yield of 94%, of weight. This polyepoxide was medium tan in color and hazy. It was barely solid at room temperature and became soft when handled. It showed traces of crystallization after 3 days, but the amount of crystallized material did not increase upon standing for one week. It was compatible with Epon 828 in all proportions.

As a comparator to determine the relative values of bromine atoms and chlorine atoms in reducing the flammability of a polyepoxide, a chlorine-containing polyepoxide was prepared as described by Example II.

EXAMPLE II

*Preparation of a Copolymer of Tetrachlorobisphenol-A and Epichlorohydrin*

A condensation production of tetrachlorobisphenol-A and epichlorohydrin was prepared, by the reaction of 20 moles of epichlorohydrin with 2-moles of tetrachlorobisphenol-A, by duplicating the procedure described by Example I for condensing tetrabromobisphenol-A with epichlorohydrin. A yield of 87%, by weight, of the theoretical of the polyepoxide was produced. This chlorine-containing polyepoxide was a viscous liquid, very pale yellow in color and hazy. It started to crystallize upon standing for 2 to 3 days, and was completely crystallized after one week.

Table I gives a comparison of the properties of the condensation product of tetrabromobisphenol-A and epichlorohydrin prepared as described by Example I and those of the condensation product of tetrachlorobisphenol-A and epichlorohydrin prepared as described by Example II with those of Epon 828 and Epon 834.

TABLE I.—COMPARISON OF THE PROPERTIES OF THE CONDENSATION PRODUCT OF TETRABROMOBISPHENOL-A WITH EPICHLOROHYDRIN, THE CONDENSATION PRODUCT OF TETRACHLOROBISPHENOL-A WITH EPICHLOROHYDRIN, EPON 828 AND EPON 834

| Resin | Color [1] | Epoxy Value [3] | Epoxide Equiv.[4] | Viscosities, cps. | | |
|---|---|---|---|---|---|---|
| | | | | 24° C. | 60° C. | Sol.[5] |
| Br—cont. Polyepoxide | 4 | 0.230 | 435 | | 98,000 | 25 |
| Cl—cont. Polyepoxide | 1 | 0.309 | 324 | | 5,000 | 24 |
| Epon 828 | [2] 12 | 0.508 | 197 | 16,200 | 410 | |
| Epon 834 | 10 | 0.376 | 266 | | 8,500 | 35 |

[1] Gardner scale measured on a 40%, by weight solution in butyl carbitol except as noted.
[2] Gardner scale measured on 100% resin.
[3] Epoxy value equivalent per 100 gms. of resin.
[4] Grams of resin containing one equivalent weight of epoxide.
[5] Viscosity in cps. at 30° C. of a 40%, by weight, solution of the resin in butyl carbitol.

A direct comparison of the stability of the polyepoxides of the bromine-containing polyepoxide of Example I and the chlorine containing polyepoxide of Example II showed that they were unchanged in color and viscosity after three weeks at 70° C. After one week at 130° C. both of these resins and the commercial Epon 828 darkened slightly and showed a slight increase in viscosity. When maintained at a temperature of 160° C. for two days, both the brominated polyepoxide of Example I and the chlorinated polyepoxide of Example II showed a marked increase in viscosity.

The behavior of the bromine-containing polyepoxide of Example I was compared with that of the chlorine-containing polyepoxide and the commercial Epon 828, using methylene dianiline as a catalyst with each resin, as described by Example III.

EXAMPLE III

*The Curing of the Bromine Containing Polyepoxide of Example I, of the Chlorine Containing Polyepoxide of Example II and of Epon 828*

The bromine-containing polyepoxide prepared as described by Example I, the chlorine-containing polyepoxide prepared as described by Example II and a sample of the commercial Epon 828, were cured utilizing methylene dianiline as a catalyst. The quantity of the methylene dianiline used with each of these materials was calculated by the use of the formula:

$$\frac{\text{Mol. wt. of catalyst}}{\text{No. of active hydrogens}} \times 100 = \text{gms. of catalyst}/100 \text{ gm. of resin.}$$
$$\text{Resin epoxide equivalent wt.}$$

The resin was heated to 90°–100° C. and the melted catalyst at 95°–100° C. added to it and mixed in well. The resinous mixture was kept at 90° C. during the mixing to avoid crystallization of the methylene dianiline. After thorough mixing, the resin was poured into an appropriate mold. For heat distortion tests this was a 0.5 inch square steel tube, 6 inches in length. For testing flame retardant properties, a slab was poured which was 0.25 inch thick, 3 inches wide and 5 inches long. A silicone resin was used in each case as a parting agent. The castings were cured by heating two hours at 100° C., followed by two hours at 130° C. The behavior of each of these resins during the curing cycle is summarized by Table II.

TABLE II.—THE CURING OF THE BROMINE-CONTAINING POLYEPOXIDE OF EXAMPLE I, THE CHLORINE CONTAINING POLYEPOXIDE OF EXAMPLE II AND OF EPON 828 USING METHYLENE DIANILINE AS A CATALYST AND A TEMPERATURE OF 100° C.

| Resin—10 gm. of each | Catalyst, grams | Gel Time, minutes | Time to Harden, minutes |
|---|---|---|---|
| Br—cont. Polyepoxide | 1.14 | 25 | 75 |
| Cl—cont. Polyepoxide | 1.53 | 35 | 75 |
| Epon 828 | 2.48 | 20 | 25 |

From the data of Table II, it will be noted that both the bromine-containing polyepoxide of Example I and the chlorine-containing polyepoxide of Example II gelled and hardened noticeable slower than Epon 828.

The physical properties of the bromine-containing polyepoxide of Example I, those of the chlorine-containing polyepoxide of Example II and of Epon 828 after each was cured as described by Example III, are given by Table III.

TABLE III.—THE PHYSICAL PROPERTIES OF THE BROMINE-CONTAINING POLYEPOXIDE OF EXAMPLE I, THE CHLORINE-CONTAINING POLYEPOXIDE OF EXAMPLE II AND OF EPON 828 AFTER CURING BY EXAMPLE III

| Resin | Barcol Hardness | Heat Distortion Temp., ° C. |
|---|---|---|
| Br—cont. Polyepoxide | 40 | 123 |
| Cl—cont. Polyepoxide | 40 | 106 |
| Epon 828 | 33 | 133 |

As shown by the data of Table III both the bromine-containing polyepoxide of Example I and the chlorine-containing polyepoxide of Example II were strong and hard after being cured as described by Example III. They were, in fact, definitely harder than the cured Epon 828. Further, it will be noted that the cured bromine-containing polyepoxide had a definitely higher heat distortion temperature than the cured chlorine-containing polyepoxide, but somewhat lower one than the cured Epon 828.

The effect of the bromine-containing epoxide of Example I and of the chlorine-containing polyepoxide of Example II in reducing the flammability of Epon 828 were compared as described by Example IV.

EXAMPLE IV

*Comparison of the Effect of the Bromine-Containing Polyepoxide of Example I and of the Chlorine-Containing Polyepoxide of Example II in Reducing the Flammability of Epon 828*

Cured slabs of Epon 828, of mixtures of Epon 828 with 5%, by weight, 10%, by weight, and 20%, by weight, respectively, of the bromine-containing polyepoxide of Example I and of mixtures of Epon 828 with 5%, by weight, 10%, by weight, and 20%, by weight, of the chlorine-containing polyepoxide of Example II were prepared following the procedure described by Example III using a curing cycle of 2 hours at 100° C. followed by 2 hours at 130° C. Strips having cross-sectional dimensions of 1/16 inch by 1/4 inch were cut off of each casting and marked 1 inch and 3 inches from one end. The flammability of each of these strips was tested by supporting it in a clamp with its longitudinal axis horizontal and its transverse axis inclined at 45 degrees to the horizontal. A piece of wire gauze was supported 3/8 inch below the strip, so that 1/2 inch of the strip projected beyond the gauze. The strip was ignited by holding a 1 inch gas flame under its outer end for 10 seconds and allowed to burn in a still atmosphere. It was found that only the bars of unmodified Epon 828 burned for any appreciable distance, so only the total time the bar continued to burn could be used for comparative purposes. The Epon 828 strips burned at the rate of 0.6 to 0.9 inch per minute, while the Epon 828 strips containing 5%, by weight, of the bromine-containing polyepoxide of Example I or of the chlorine-containing polyepoxide of Example II burned at the rate of about 0.2 inch per minute. The strips containing 10%, by weight, and 20%, by weight, of the halogenated polyepoxides were so flame retardant that the flame did not travel along the sample and only the material heated by the flame during the ignition step continued to burn for a short time after the flame was removed. The total time which the burning continued in the case of each strip tested is shown by Table IV.

TABLE IV.—TOTAL BURNING TIME OF CURED EPON 828 AND OF CURED MIXTURES OF EPON 828 WITH THE BROMINE CONTAINING EPOXIDE OF EXAMPLE I AND WITH THE CHLORINE CONTAINING EPOXIDE OF EXAMPLE II

| Resin | Time of Burning in Sec. | Ave. |
|---|---|---|
| Epon 828 | 85, 152, 191, 138, 120 | 137 |
| Epon 828 Containing: | | |
| 5% Br—cont. Polyepoxide | 30, 57, 52, 53 | 45 |
| 10% Br—cont. Polyepoxide | 11, 11, 12, 10 | 11 |
| 20% Br—cont. Polyepoxide | 10, 9, 7, 8 | 8 |
| 5% Cl—cont. Polyepoxide | 66, 68, 50, 83 | 67 |
| 10% Cl—cont. Polyepoxide | 29, 45, 48, 15 | 34 |
| 20% Cl—cont. Polyepoxide | 28, 28, 30, 6 | 23 |

Thus, as shown by the data of Example IV, both the bromine-containing epoxide and the chlorine-containing epoxide were definitely effective in reducing the flammability of the non-halogenated polyepoxide in amounts as low as 5%, by weight, and in making the non-halogenated polyepoxide flame retardant in proportions of 10%, by weight, and 20%, by weight. Further, this data shows that the bromine-containing polyepoxide was definitely more effective than the chlorine-containing polyepoxide in this respect at each percentage level. In fact, the data of Table IV shows that 10%, by weight, of the bromine-containing epoxide (ave. time of burning—11 sec.) was more effective than 20%, by weight, of the chlorine-containing polyepoxide (ave. time of burning—23 sec.).

From the foregoing, it will be appreciated that the bromine-containing polyepoxides in accordance with this invention can be cured to produce plastics which on one hand have satisfactory physical characteristics and, on the other, offer the outstanding advantage of being self-extinguishing and adapted for uses in which non-flammability is of prime importance. Further, it will be understood from an analysis of the data presented by the foregoing examples, that these bromine-containing polyepoxides offer an outstanding advantage arising from their compatibility with the non-brominated polyepoxides, the ease with which their mixtures with the non-brominated polyepoxides can be cured, and their material reduction of the flammability of the non-brominated polyepoxides when the brominated polyepoxides are present only in relatively minor proportions.

The foregoing has included disclosures of many details and specific examples of both the bromine-containing polyepoxides and their admixtures with non-brominated polyepoxides, for the purpose of fully disclosing the various ramifications of this invention. It will be fully understood by those skilled in resin chemistry that many changes, substitutions and variations can be made from the details which have been given in the foregoing, without departing from the spirit of my invention or the scope of the following claims.

I claim:
1. A plastic product comprising a cured mixture of the bromine-containing condensation product of a nuclear brominated bisphenol containing at least one, and not more than two, bromine atoms on each phenyl radical, and a chlorohydrin in amount within the range of about 2%, by weight, to about 50%, by weight, and a non-halogenated condensation product of a bisphenol and a chlorohydrin within the range of about 98%, by weight, to about 50%, by weight.

2. A plastic product comprising a cured mixture of the condensation product of a chlorohydrin and 2,2-bis-(3,5 dibromo-4-hydroxphenyl)propane in amount within the range of about 2%, by weight, to about 50%, by weight, and a non-halogenated condensation product of a bisphenol and a chlorohydrin within the range of about 98%, by weight, to about 50%, by weight.

3. A plastic product comprising a cured mixture of the condensation product of epichlorohydrin and 2,2-bis-(3,5 dibromo-4-hydroxyphenyl)propane in amount within the range of about 2%, by weight, to about 50%, by weight, and a non-halogenated condensation product of a bisphenol and a chlorohydrin within the range of about 98%, by weight, to about 50%, by weight.

4. A plastic product comprising a cured mixture of the condensation product of glycerol chlorohydrin and 2,2-bis(3,5 dibromo-4-hydroxyphenyl)propane in amount within the range of about 2%, by weight, to about 50%, by weight, and a non-halogenated condensation product of a bisphenol and a chlorohydrin within the range of about 98%, by weight, to about 50%, by weight.

References Cited in the file of this patent

UNITED STATES PATENTS

| 2,548,447 | Shokal et al. | Apr. 10, 1951 |
| 2,801,227 | Goppel | July 30, 1957 |
| 2,824,083 | Parry et al. | Feb. 18, 1958 |